United States Patent
Valstyn et al.

[11] Patent Number: 5,917,680
[45] Date of Patent: Jun. 29, 1999

[54] MAGNETORESISTIVE HEAD WITH MAGNETIC BIAS LEVEL CONTROL

[75] Inventors: Erich P. Valstyn, Los Gatos; Charles R. Bond, Milpitas; Daniel A. Nepela, San Jose, all of Calif.

[73] Assignee: Read-Rite Corporation, Milpitas, Calif.

[21] Appl. No.: 08/668,859

[22] Filed: Jun. 24, 1996

[51] Int. Cl.$^6$ .................................................. G11B 5/127
[52] U.S. Cl. ............................................. 360/113; 360/66
[58] Field of Search ................................ 360/113, 67, 66

[56] References Cited

U.S. PATENT DOCUMENTS

| | | | |
|---|---|---|---|
| 3,979,775 | 9/1976 | Schwarz | 360/113 |
| 4,191,977 | 3/1980 | Lewkowicz | 360/66 |
| 4,879,610 | 11/1989 | Jove et al. | 360/113 |
| 5,301,080 | 4/1994 | Ottesen et al. | 360/113 |
| 5,327,303 | 7/1994 | Smith | 360/113 |
| 5,331,478 | 7/1994 | Aranovsky | 360/67 |

*Primary Examiner*—Nabil Hindi
*Attorney, Agent, or Firm*—Nathan N. Kallman

[57] ABSTRACT

A magnetoreristive head assembly has a magnetic bias level control for continuous compensation of thermal, stray field and stress fluctuations, as well as other types of fluctuations. The magnetoresistive head assembly includes a magnetoresistive element for sensing signals recorded on a magnetic medium, and for generating electrical signals corresponding to the recorded signals. A bias current balancing circuit has an input connected to the magnetoresistive element for sensing the electrical signals and for generating a correction bias current therefrom. A feedback correction circuit converts the correction bias current into a correction magnetic bias field and applies the field to the magnetoresistive element to limit the shifting of a current bias point of the magnetoresistive element and to compensate for bias fluctuations.

6 Claims, 2 Drawing Sheets

MAGNETORESISTIVE HEAD WITH MAGNETIC BIAS LEVEL CONTROL

FIELD OF THE INVENTION

This invention relates to magnetic heads and in particular to a magnetoreristive (MR) head assembly having a magnetic bias level control for continuous compensation for thermal, stray field and stress fluctuations, and other types of fluctuations.

DESCRIPTION OF THE PRIOR ART

Prior art magnetic head assemblies include inductive elements for recording data onto a magnetic disk, and magnetoresistive (MR) elements for reading the recorded data from the disk. The operation of the MR element is based on the principle that the resistance of certain materials changes when subjected to a magnetic field. Output signals from the MR element are generated by supplying it with a constant direct electrical current. The flux from the magnetic disk that is seen by the sensing MR element is reflected by a change in voltage that is proportional to the change in resistance of the material caused by the flux.

One problem when using a MR element is the susceptibility of the MR element to changes in the operating environment, such as thermal, stray field and stress variations. Several solutions have been proposed to overcome this problem. For instance, one such solution has been to use an additional resistive layer for MR element biasing and for thermal noise and drift compensation, as described in "Resistive Element for Bias and Noise Cancellation of Magnetoresistive Head," IBM Technical Disclosure Bulletin, at Vol. 17, NO. 9, February 1975, page 2759, and "Self-Biased Noise Free Magnetoresistive Head," IBM Technical Disclosure Bulletin, at Vol. 17, NO. 7, December 1974, page 1872.

Further, U.S. Pat. No. 3,860,965, to Voegeli discloses the use of two MR elements. The two MR elements are interconnected to a differential amplifier to provide the common mode rejection of the thermal noise spikes and resistance change.

However, the requirement of one or more compensation MR elements adds to the fabrication complexity of the magnetic head, and thus leads to increased manufacturing cost.

SUMMARY OF THE INVENTION

An object of this invention is to provide an MR head with a bias level control circuit that continuously compensates for thermal, stray field and stress fluctuations, and other types of fluctuations.

Another object of the present invention is to provide an MR head assembly with bias current balancing circuitry that does not require the use of additional MR elements.

According to this invention, a magnetoresistive (MR) head assembly has a magnetic bias level control that continuously compensates for thermal, stray field and stress fluctuations, and other types of fluctuations. The MR head assembly includes an MR element for sensing magnetically recorded information from a medium, and for generating electrical signals corresponding to the recorded information. A bias current balancing circuit has its input connected to the MR element for sensing the electrical signals and for correcting the bias in a way that the second-harmonic content of the MR output is minimized.

Pursuant to one embodiment, the bias current balancing circuit includes a second harmonic frequency detector that has its output connected to a current regulator and therefrom to the MR element.

Pursuant to another embodiment, the second harmonic frequency detector is connected to a bias conductor and supplies it with a correction bias current $\pm I_C$. The bias conductor is positioned in proximity to the MR element and converts the correction bias current $\pm I_C$ into a corresponding correction bias magnetic field. A current regulator supplies a constant D.C. bias current $I_B$ to the MR element, independent of the correction bias current $\pm I_C$ to the bias conductor.

In yet another embodiment, the bias current balancing circuits of the present invention are used in yoke-type MR heads to compensate for variations in the remanence of the yoke material that result from various sources, such as the writing process.

BRIEF DESCRIPTION OF THE DRAWING

The invention will be described in greater detail with reference to the drawing in which.

Similar numerals refer to similar elements in the drawing.

DETAILED DESCRIPTION OF THE INVENTION

Figure 1:
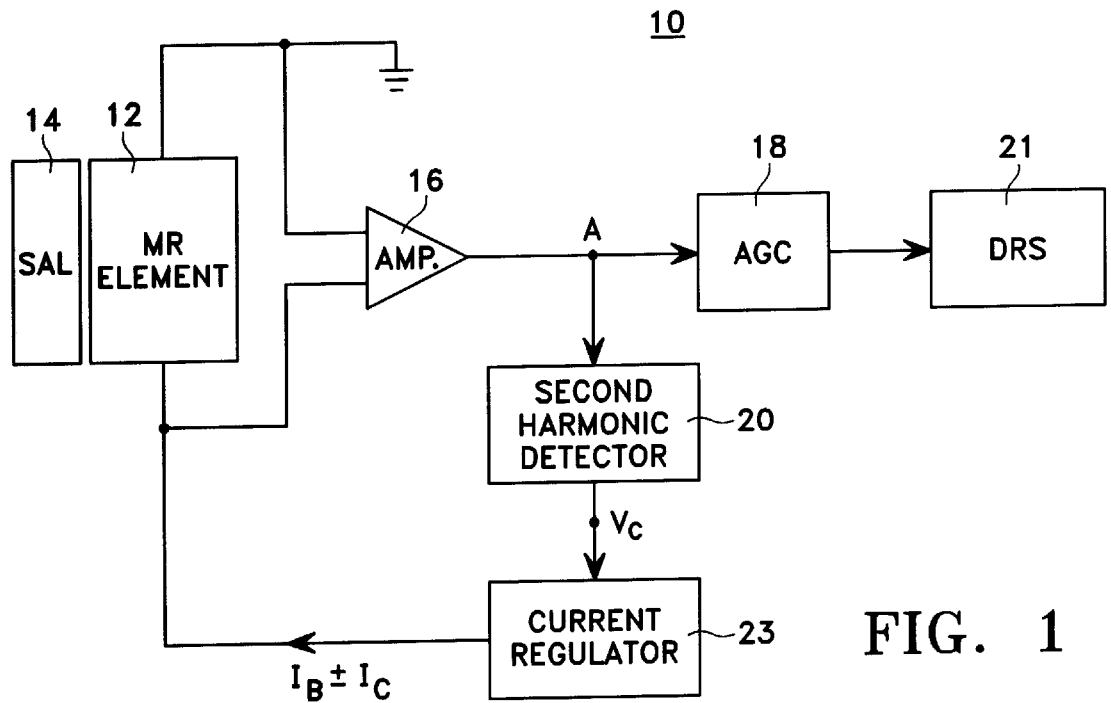
FIG. 1 is a circuit block diagram of a first embodiment of an MR head assembly including a bias current balancing circuit according to the present invention.

FIG. 1 represents a circuit block diagram of an MR head assembly 10 that generally includes an MR element 12 placed in proximity to a soft adjacent layer (SAL) 14. The MR head assembly 10 includes a differential amplifier 16 having inputs that are connected across the MR element 12, and an output that is connected to an automatic gain control circuit (AGC) 18 and to a bias current balancing circuit 20. The output of the automatic gain control circuit 18 is fed to a data recovery system (DRS) 21 as is well known in the art. The output of the bias current balancing circuit 20 is fed to a current regulator 23 that provides a DC bias current $I_B$ to the MR element 12.

In this particular embodiment the bias current balancing circuit 20 is a second harmonic frequency detector that senses the occurrence of signals at the second harmonic frequency. In operation, the bias current balancing circuit 20 generates and delivers a control voltage $V_C$ to the current regulator 23, such that a resulting bias current $I_B$, which flows through the MR element 12, results in minimizing the second-harmonic content of the output voltage $V_O$.

The passage of the resulting current I through the MR element 12 induces a direct magnetic field $H_B$ on the MR element 12, and further causes the SAL 14 to be magnetized and to induce a correction magnetic field $H_C$ that is applied to the MR element 12. In this particular embodiment, the current regulator 23 and the SAL 14 form a feedback correction circuit. The induced correction magnetic field $H_C$, either increases or decreases the bias magnetic field $H_B$, and causes the MR element 12 to operate within an optimal bias range.

Figure 2:
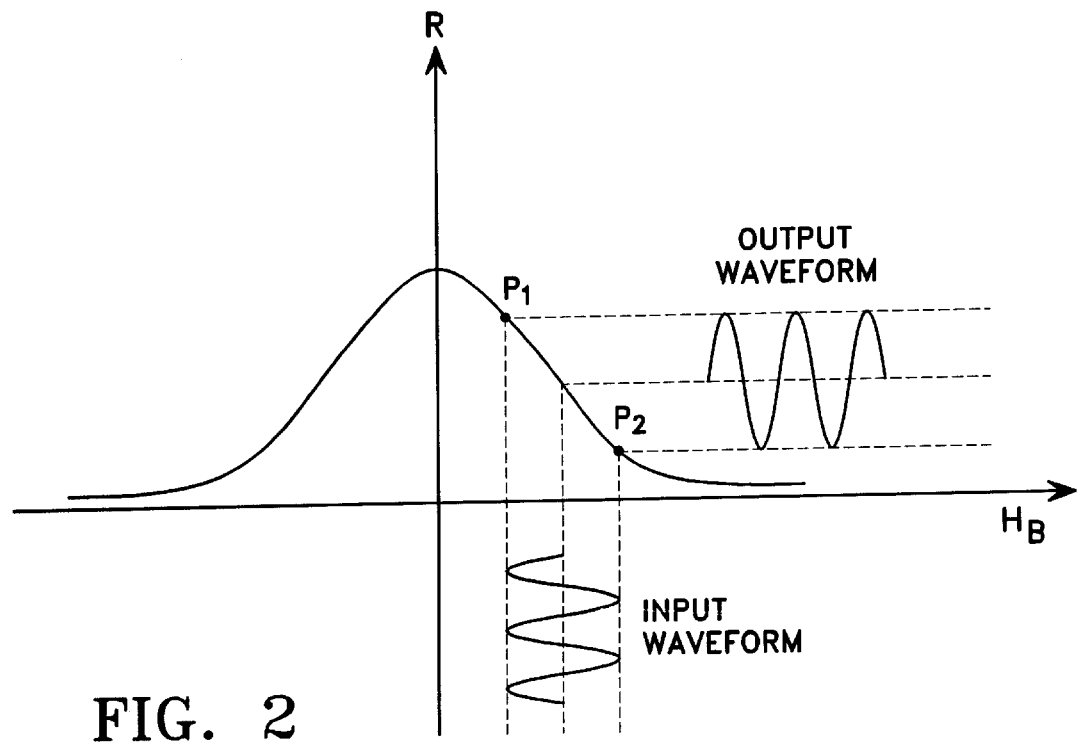
FIG. 2 represents a characteristic curve showing a change in the electrical resistance R of an MR element forming part of the MR head assembly of FIG. 1, relative to a magnetic field $H_B$ applied to the MR element.

The theory of the bias current balancing and compensation for the MR element 12 will be explained in connection with the characteristic curve of FIG. 2. The characteristic curve is generally a bell-shaped curve showing a change in the electrical resistance R of the MR element 12 relative to a bias magnetic field $H_B$ applied to the MR element 12. The MR element 12 may operate on either the positive-slope side or the negative-slope side of the characteristic curve. For purpose of illustration, the MR element 12 will be described as operating along the negative-slope side of the characteristic curve.

For optimal sensing, it would be desirable to keep the bias point of the MR element 12, in such a position on the characteristic curve that the resistance excursions remain in a quasi-linear region P1-P2 so that the output waveform conforms closely to the input waveform. On the other hand, if the resistance variations were allowed to drift beyond the region P1-P2 the output waveform will be excessively distorted and second harmonic signals will be generated. The drifting of the bias point may be caused by several factors, some of which are stray fields fluctuations, thermal fluctuations, and stress variations. It is therefore an object of the present invention to compensate for these factors by maintaining the bias point near the center of the region P1-P2.

This object is achieved by means of the bias current balancing circuit or the second harmonic frequency detector 20. As the bias point drifts away from the center of the quasi-linear region P1-P2, the second harmonic frequency detector 20 senses the presence of the generated second harmonic signals, and generates a correction voltage $V_C$ that corresponds to these signals. The correction voltage $V_C$ is applied to the current regulator 23, which, in turn, generates a corresponding correction bias current $\pm I_C$ for regulating the resulting bias current I ($I=I_B+I_C$) delivered to the MR element 12. The sense of the correction bias current is determined by the drift direction of the bias point away from the center of the region P1-P2. A variation in the resulting bias current I results in a corresponding variation of the signal amplitude at the output of the preamplifier 16, and the automatic gain control circuit 18 compensates for such amplitude variation.

Figure 3:
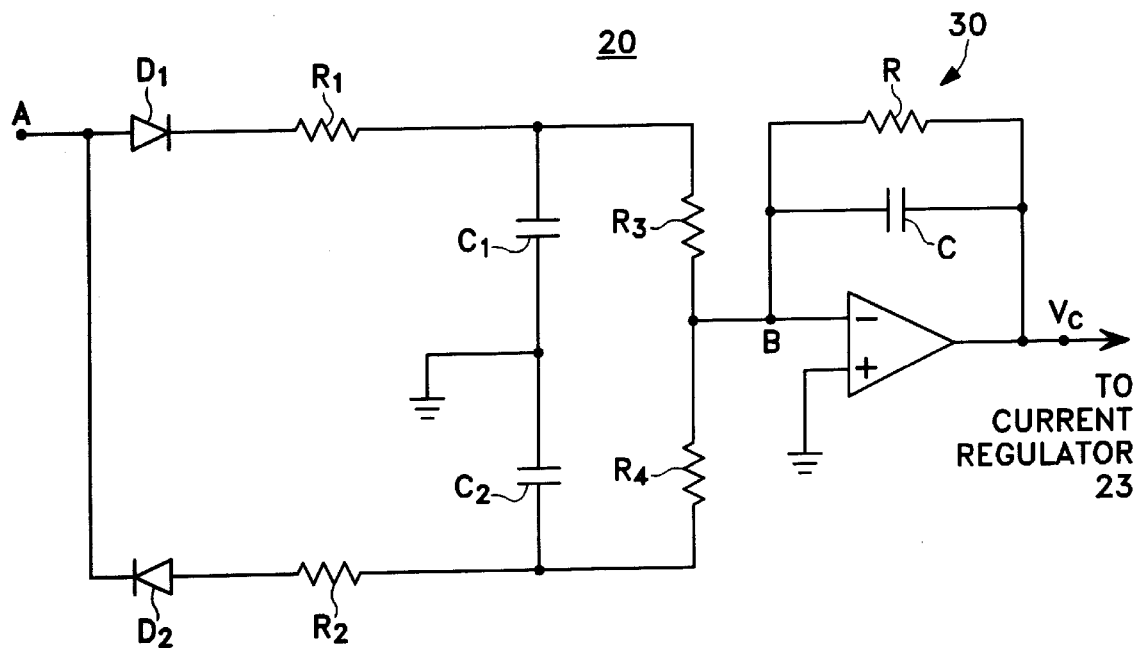
FIG. 3 is a circuit diagram of a second harmonic frequency detector forming part of the bias current balancing circuit of FIG. 1.

FIG. 3 illustrates an exemplary second harmonic frequency detector 20. The second harmonic frequency detector 20 detects the voltage at the output "A" of the preamplifier 16. It allows the signal positive peaks to pass through a diode D1 and a resistor R1 in series with the diode D1, and allows the signal negative peaks to pass through a diode D2 and a resistor R2 in series with the diode D2. The positive and negative peaks are independently averaged and stored in capacitors C1 and C2 respectively. The averages of the positive and negative peaks are then compared using two resistors R3 and R4, and the difference of these averages is fed to the input B of a differential amplifier circuit 30. The output $V_C$ of the differential amplifier circuit 30 is fed to the current regulator 23 as explained above.

Figure 4:
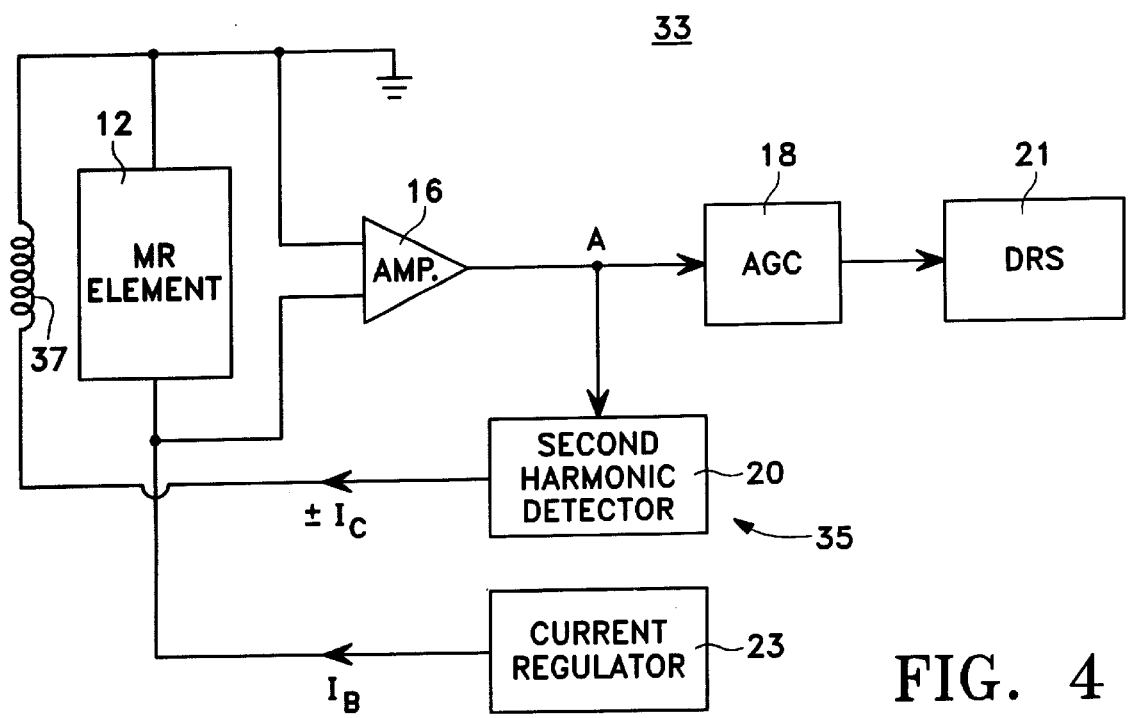
FIG. 4 is a circuit block diagram of a second embodiment of an MR head assembly including a bias current balancing circuit, according to the present invention.

FIG. 4 is a circuit block diagram of another embodiment of an MR head assembly 33 including a bias current balancing circuit 35 according to the present invention. While in the MR head assembly 10 of FIG. 1 the bias current $I_B$ is modulated with the correction bias current $I_C$ as it is applied to the MR element 12, the bias current balancing circuit 35 of the MR head assembly 33 aims at maintaining a constant bias current $I_B$. The bias current $I_B$ is applied to the MR element 12. A correction bias current $I_C$ is independently passed in a separate bias conductor 37 adjacent to the MR element 12, so that the bias current balancing circuit 35 regulates the effective field induced through the MR element 12, such that the second harmonic signals are minimized. In this particular embodiment the bias conductor 37 forms a feedback correction circuit that converts the correction bias current $\pm I_C$ into a correction magnetic bias field to be applied to the MR element 12.

While the bias current balancing circuit 35 above has been described in connection with a second harmonic detector 35, a SAL 14, and a bias conductor 37, it should be understood that other means may be employed to place the bias point of the MR element 12 near the center of the region P1-P2. For instance, it is possible to use a permanent magnet thin film to replace the SAL 14.

The bias current balancing circuits disclosed herein offer a solution to the main problem in yoke-type MR heads, namely the remanence of the yoke material. Although this remanence is small, it has a strong effect on the MR element since the thickness of the yoke is much greater than that of the MR stripe. This remanence varies due to various excitations, but especially as a result of the write process, and consequently, the bias field applied to the MR element changes significantly. The present bias current balancing circuits compensate for variations in the bias field.

What is claimed is:

1. A magnetoresistive head assembly comprising:

a magnetoresistive element for sensing signals recorded on a magnetic medium and for generating electrical signals corresponding to said recorded signals;

a soft adjacent layer in proximity with said magnetoresistive element for providing a biasing magnetic field to said element;

a bias current balancing circuit having an input connected to said magnetoresistive element for sensing said electrical signals and for generating a correction bias current therefrom, wherein said bias current balancing circuit includes a second harmonic frequency detector; and a feedback correction circuit including said soft adjacent layer for converting said correction bias current into a correction magnetic bias field to be applied to said magnetoresistive element to limit the shifting of a bias point of said magnetoresistive element and to compensate for bias fluctuations, wherein said feedback correction circuit includes a current regulator; and wherein said second harmonic frequency detector has its output connected to said current regulator for providing a control voltage to cause said current regulator to supply a bias current to said magnetoresistive element so that the second-harmonic content of the gutput signal from said head assembly is minimal.

2. A magnetoresistive head assembly comprising:

a magnetoresistive element for sensing signals recorded on a magnetic medium and for generating electrical signals corresponding to said recorded signals;

a bias current balancing circuit having an input connected to said magnetoresistive element for sensing said electrical signals and for generating a correction bias current therefrom, wherein said bias current balancing circuit includes a second harmonic frequency detector;

a feedback correction circuit for converting said correction bias current into a correction magnetic bias field to be applied to said magnetoresistive element to limit the shifting of a bias point of said magnetoresistive element and to compensate for bias fluctuations, wherein said feedback correction circuit includes a current regulator, and wherein said second harmonic frequency detector has its output connected to said current regulator for providing a control voltage to cause said current regulator to supply a bias current to said magnetoresistive element so that the second-harmonic content of the output signal from said head assembly is minimal; wherein said feedback correction circuit further includes a soft adjacent layer placed in proximity to said magnetoresistive element for generating a correction magnetic bias field for application to said magnetoresistive element;

an automatic gain control circuit; and an amplifier that has an input connected to said magnetoresistive element and an output connected to said second harmonic frequency detector and to said automatic gain control circuit.

3. A magnetoresistive head assembly according to claim 2, including a data recovery system, wherein said automatic gain control circuit has an output connected to said data recovery system.

4. A magnetoresistive head assembly comprising:

a magnetoresistive element for sensing signals recorded on a magnetic medium and for generating electrical signals corresponding to said recorded signals;

a bias current balancing circuit having an input connected to said magnetoresistive element for sensing said electrical signals and for generating a correction bias current therefrom, wherein said bias current balancing circuit includes a second harmonic frequency detector; and a feedback correction circuit for converting said correction bias current into a correction magnetic bias field to be applied to said magnetoresistive element to limit the shifting of a bias point of said magnetoresistive element and to compensate for bias fluctuations, wherein said feedback correction circuit includes a bias conductor that is placed in proximity to said magnetoresistive element; and wherein said second harmonic frequency detector has an output connected to said bias conductor so that said correction bias current passes through said bias conductor for generating a correction magnetic bias field to be applied to said magnetoresistive element.

5. A magnetoresistive head assembly according to claim 4, including an automatic gain control circuit, and an amplifier that has an input connected to said magnetoresistive element and an output connected to said second harmonic frequency detector and to said automatic gain control circuit.

6. A magnetoresistive head assembly according to claim 5, including a data recovery system, wherein said automatic gain control circuit has an output connected to said data recovery system.

* * * * *